United States Patent [19]

Antony

[11] Patent Number: 5,788,022

[45] Date of Patent: Aug. 4, 1998

[54] DISC BRAKE

[75] Inventor: Paul Antony, Worms, Germany

[73] Assignee: Perrot Bremsen GmbH, Mannheim, Germany

[21] Appl. No.: 609,643

[22] Filed: Mar. 1, 1996

[30] Foreign Application Priority Data

Mar. 2, 1995 [DE] Germany .................. 195 07 308.8

[51] Int. Cl.⁶ .................................................. F16D 55/02
[52] U.S. Cl. ...................... 188/71.8; 188/72.7; 188/72.9; 188/196 D
[58] Field of Search ..................... 188/72.9, 72.7, 188/72.8, 196 D, 196 P, 196 F, 71.8, 71.9; 192/111 A

[56] References Cited

U.S. PATENT DOCUMENTS

| | | | |
|---|---|---|---|
| 3,991,859 | 11/1976 | Coulter et al. | 188/196 F X |
| 5,038,895 | 8/1991 | Evans | 188/72.9 X |
| 5,123,505 | 6/1992 | Antony | 188/196 F X |
| 5,400,875 | 3/1995 | Anthony et al. | 188/72.9 |

FOREIGN PATENT DOCUMENTS

| | | |
|---|---|---|
| 05341321B1 | of 0000 | European Pat. Off. . |
| 0614025 A1 | 9/1994 | European Pat. Off. . |
| 4307018 A1 | 9/1994 | Germany . |
| 4307019 A1 | 9/1994 | Germany . |
| 4430258 C1 | 1/1996 | Germany . |

*Primary Examiner*—Lee W. Young
*Attorney, Agent, or Firm*—Jacobson, Price, Holman & Stern, PLLC

[57] ABSTRACT

In a disc brake having, a thrust piece which extends parallel to the plane of the brake rotor and which presses a brake pad against the rotor in the direction of the axis of the rotor, an adjusting mechanism is provided which includes a torque-dependent one-way coupling for obtaining automatic, wear-compensating adjustment of the gap between the brake pad and the brake rotor. The torque-dependent one-way coupling is coupled to the thrust piece in such a way that it moves along with the thrust piece in the direction of the axis of the rotor.

12 Claims, 2 Drawing Sheets

DISC BRAKE

BACKGROUND OF THE INVENTION

This invention relates to a disc brake having a thrust piece which extends parallel to the plane of the brake rotor and which presses a brake pad axially towards and against the rotor, when an application mechanism is actuated, responsive to rotation of an application element; and the brake also having an adjustment mechanism which includes a torque-dependent one-way coupling for providing automatic, wear-compensating adjustment of the gap between brake pad and rotor.

A disc brake of the above kind disclosed, for example in German OS 43 07 018 A1 and European AS 0,531,321 B1, each of which are incorporated herein by reference.

The known disc brakes are sliding-caliper disc brakes wherein the torque-dependent one-way coupling is mounted on (or against) the caliper and is axially displaceable with the caliper.

When such disc brakes are actuated, the thrust piece with associated thrust screw and brake pad are pressed axially against the corresponding face of the rotor, and the reaction force causes the caliper to shift in the opposite direction, whereby the second oppositely directed brake pad which is coupled to the caliper is pressed against the opposite face of the rotor.

In the course of this "spreading" (as the caliper action is called), the torque-dependent one-way coupling, which is mounted on the caliper, undergoes an axial movement relative to the part (here, the thrust screw associated with the thrust piece) which is being urged along with the thrust piece in the direction of the brake rotor, which part is simultaneously subject to being screwed out of the thrust piece so as to elongate the structure comprising the thrust piece and said part, by means of the adjusting mechanism.

This effect also occurs in fixed-caliper disc brakes: In such brakes, the torque-dependent one-way coupling stays axially fixed and does not move with the caliper; nonetheless, relative movement of the torque-dependent one-way coupling occurs with respect to the thrust piece and thereby with respect to the thrust screw.

This is disadvantageous: Relative movement between the torque-dependent one-way coupling and thrust piece (and thrust screw) carries with it a danger of canting and locking.

A further disadvantage of mounting the adjusting mechanism on the caliper is that if the caliper is subjected to strong vibrations, such as when the vehicle travels over a bumpy road surface, then deviations in the course of movement can occur for the actuation of the thrust piece (and thereby the thrust screw), in comparison to the operation of the adjusting mechanism. Such deviations can lead to adjustments of inappropriate magnitude, whereby the gap between the pad and rotor becomes too wide or too narrow. In either case, the functioning of the brake is detrimentally affected.

Finally, if the torque-dependent one-way coupling is fixed to the caliper, the overall structure is rendered substantially larger and more complex, and the costs of assembling and disassembling are increased.

SUMMARY OF THE INVENTION

It is an object of the present invention to improve a disc brake of the type described, such that:

the adjusting mechanism is not subject to spurious canting or locking;

vibrations of the caliper do not have a detrimental effect on the functioning of the adjusting mechanism;

the installation space required is minimized; and the brake can be assembled and disassembled easily.

According to the invention, for disc brakes of the type described the torque-dependent one-way coupling is coupled to the thrust piece in such a way that it moves along with the thrust piece in the direction of the axis of the brake rotor.

The result of the coupling of the torque dependent one-way coupling and the thrust piece with regard to movement in the direction of the axis of the brake rotor is that these two elements always move together. Essentially no relative movement occurs between the two elements and in this way, canting and locking are substantially prevented.

The solution comprising the described coupling of the torque-dependent one-way coupling and the thrust piece cannot involve a coupling of the torque-dependent one-way coupling with the caliper, because when the brake is actuated relative movement is produced between the caliper and the thrust piece. With these two elements de-coupled, vibrations of the caliper can no longer be transmitted to the torque-dependent one-way coupling, and thus can no longer affect the adjustment of the brake.

The described de-coupling of the torque-dependent one-way coupling from the caliper allows the one-way coupling to be disposed at a distance from the caliper, whereby the one-way coupling can be disposed close to the thrust piece. The effect is to reduce the overall length of the space required to accommodate the brake.

Finally, the torque-dependent one-way coupling can be formed as a single subassembly along with the trust piece, because the one-way coupling is coupled to the thrust piece. This facilitates assembly and disassembly of the brake.

In a particularly simple and effective embodiment of the invention, the torque-dependent one-way coupling is disposed on a thrust bushing which is threadedly coupled to a thrust screw which is disposed on the side of the brake pad directed away from the rotor, and the torque-dependent one-way coupling is coupled to the thrust piece for movement in the direction of the axis of the rotor.

Means for limiting the screwing-together of the thrust screw and the trust bushing may be provided on the screw and/or on the bushing, in order to prevent excessive screwing-together during release and retraction of the brake, and to avoid the resultant risk of locking.

According to the invention a surface of the thrust piece, which is directed toward the rotor, may rest against a generally oppositely directed surface of the thrust bushing, under axial compression. In this way, both components, thrust piece and thrust bushing, are functional components of the adjusting mechanism. A spring-loaded retaining ring or the like may serve to provide the compression.

Particular compactness of the overall assembly can be achieved if the thrust bushing is disposed in a opening through the thrust piece.

Preferably, the thrust bushing has a radially extending collar or the like at the end which is directed toward the brake rotor, and has a narrower projecting member and its end directed away from the rotor.

The application element may preferably comprise a profiled shaft which extends parallel to the plane of the brake rotor and wherein, generally on the side directed away from the brake rotor, the shaft is supported against a thrust counter-surface or the like, the thrust piece being disposed on the side of the shaft which is generally directed toward the brake rotor.

As illustrated, e.g., in European AS 0,531,321 B1, it may be provided that during actuation, the application element is rotated around an axis which is fixed with respect to the brake rotor.

A preferred solution is illustrated in German OS 43 07 019 A1 and in German Pat. App. P 44 30 258.4 (filed Aug. 20, 1994 and also incorporated by reference), wherein during actuation, the application element is rotated around an axis, so that with progressive application, the position of the axis with respect to the brake rotor is changed such that the line of action of the force exerted on the thrust piece from the application element does not change its position (or direction) with respect to the brake rotor.

According to a preferred embodiment of the invention, the application element is coupled to the adjusting mechanism by means of a pin-and-groove coupling.

The adjusting mechanism may be comprised of a drive bushing and a driven bushing which are disposed on the thrust bushing and coaxially with said thrust bushing, in the region of a cavity or opening in the application element.

An amount of axial play may be provided between the drive bushing and driven bushing, in order to avoid undesirable movement when releasing the brake.

To achieve appreciable vibrational de-coupling of the thrust counter-surface, against which surface the application element is buttressed and which surface acts on the application element in the direction generally toward the brake rotor, from the torque-dependent one-way coupling, a recess may be provided in the thrust counter-surface, with the end of the thrust bushing directed away from the brake rotor extending into the recess.

The recess may be a thoroughgoing opening, thereby enabling retraction of the adjusting mechanism without having to remove or retract the aforesaid thrust counter-surface.

The inventive disc brake may be a fixed caliper disc brake however, a sliding caliper disc brake is preferred according to the invention, particularly one in which the sliding caliper provides the aforesaid thrust counter-surface.

The thrust bushing may extend into a thoroughgoing opening in the aforesaid thrust counter-surface (or elsewhere in the caliper); and a guide element and/or sealing element may be provided between the aforesaid thrust counter-surface (or another part of the caliper) and the thrust bushing.

The invention will be described in more detail hereinbelow, with additional details and features, based on a preferred embodiment, with reference to the accompanying drawings.

DETAILED DESCRIPTION OF THE PREFERRED EMBODIMENTS

Figure 1:
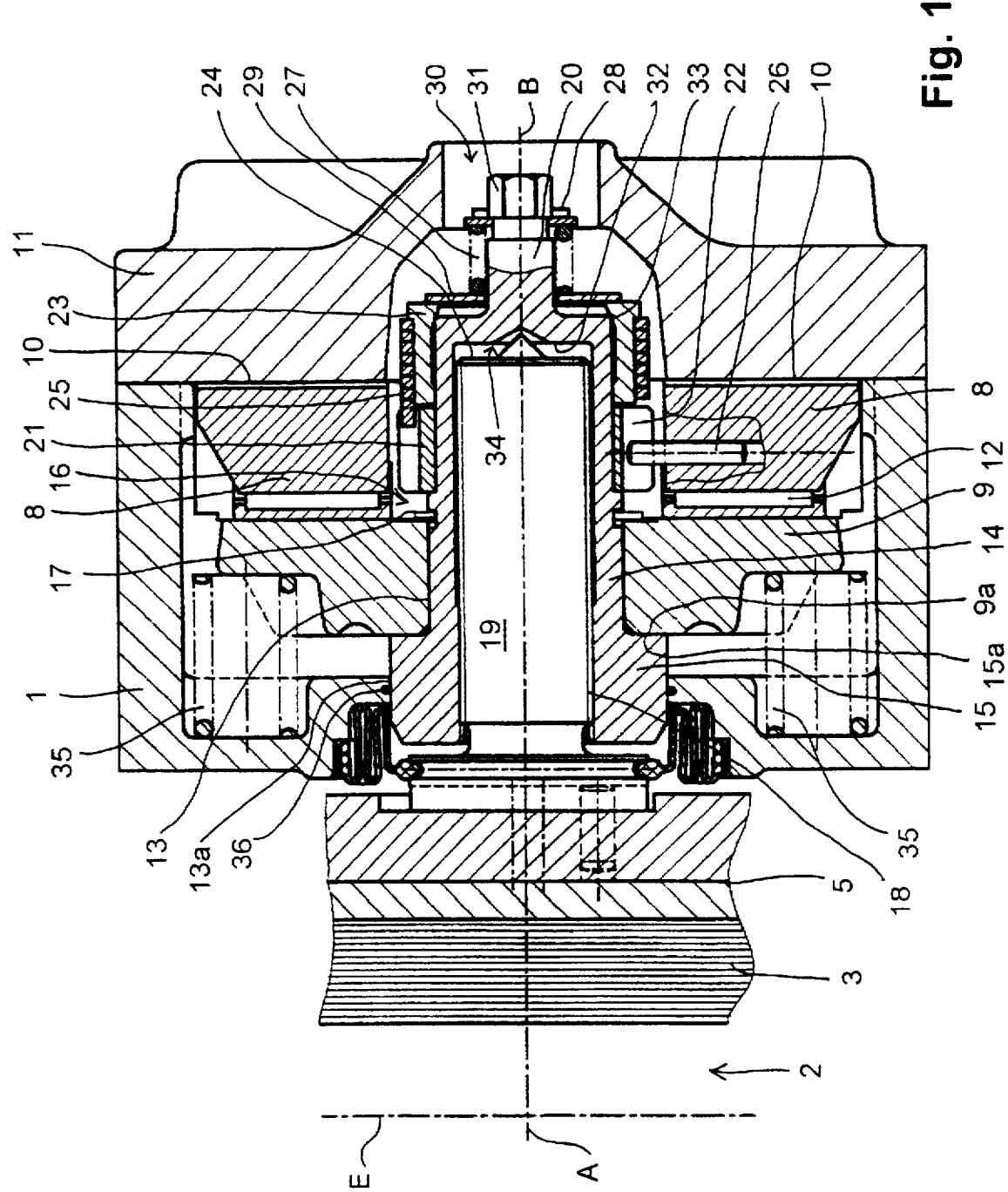
FIG. 1 is a vertical cross section through an exemplary disc brake.

The disc brake illustrated in the drawings is a sliding-caliper rotor 2 on both sides via caliper arms. On opposite sides of the rotor 2 (extending through plane q), brake pads 3, 4 mounted on pad supports 5 are guided and applied to the rotor, in a brake bracket (not shown) or in the caliper 1. The caliper 1 is mounted so as to be slidable in a direction perpendicular to the plane of the rotor. An application mechanism 6 is provided on one side of the caliper 1, for actuating the brake.

The application mechanism 6 is comprised essentially of: a brake lever 7, an application shaft 8 connected to said lever 7, which shaft 8 is generally eccentric and extends parallel to the plane of the brake rotor, and a thrust piece 9 which is slidable in the caliper 1 and comes to act against an assembly bearing the pad support 5 and pad 3, the thrust piece 9 extending parallel to the plane of the rotor 2, inside the caliper 1.

On the side of the application shaft 8 directed away from the brake rotor 2 (the right side, in FIGS. 1 and 2), the application shaft 8 abuts thrust counter-surfaces 10 of a cover 11 attached to the caliper 1 by screw means; and on the side of the application shaft 8 directed toward the brake rotor 2 (the left side, in FIGS. 1 and 2), the application shaft 8 is supported against the thrust piece 9 via approximately semicylindrical bearings 12.

The preceding notwithstanding, the present invention is not dependent on the particular type and configuration of the application mechanism 6. In the application mechanism illustrated here, as well as in the application mechanisms according to German OS 43 07 019 A1 and German Pat. App. P 44 30 258.4 (filed Aug. 25, 1994 in the German Pat. Ofc.), the rotational axis of the application shaft 8 is moved along a plane which is parallel to the plane of the brake rotor. However, in another embodiment of an application mechanism 6, the rotational axis of the application shaft is fixed with respect to the caliper.

The thrust piece 9 has a thoroughgoing opening 13 which, the axis A-B of which opening is parallel to the axis of the brake rotor 2. A thrust bushing 14 is accommodated in opening 13, and extends coaxially to axis A-B, along an opening 16 in the application shaft 8. Bushing 14 has a collar 15 at or near its end nearest to the brake rotor. Bushing 14 is axially pressed against the thrust piece 9, at a location disposed away from the brake rotor, by means of a spring retaining ring 17 or the like.

A threaded cavity 18, opening in the direction of the brake rotor 2, is provided in the thrust bushing 14. A thrust screw 19 is threaded in cavity 18. Screw 19 irrotatably abuts the actuation-side brake support 5 (or an intermediate piece). The thrust bushing 14 is closed at its end remote from the rotor. The terminus of bushing 14 on said end comprises a projection 20 which will be described below.

A surface 9a of thrust piece 9, which surface faces toward the brake rotor, rests frictionally against a corresponding surface 15a of the radial collar 15, which latter surface 15a faces away from the brake rotor. By the means described, the thrust bushing 14 is coupled to the thrust piece 9 with regard to displacement in the direction of the axis A-B; however, if the frictional coupling between the surfaces 9a and 15a is overcome, the thrust bushing 14, which is rotatably mounted in the thrust piece 9, can be rotated around the axis A-B, relative to the thrust piece 9. The thrust screw 19 is non-rotatably fixed to the pad support 5 by well-known means. Accordingly, when the thrust bushing 14 (lit., "15") is rotated by means of an adjusting mechanism, described below, the thrust screw 19 is threaded axially out of the thrust bushing 14.

The components of the adjusting mechanism are compactly disposed in series in approximately the region of the opening 16. Said components are coupled with the thrust bushing 14 and thereby with the thrust piece 9. In particular, the adjusting mechanism is comprised of a drive bushing 21 with at least one axial groove 22, a driven bushing 23 having a limited-torque region 24 (which serves as a limited torque coupling or "overload coupling") with respect to the thrust bushing 14, a one-way coupling 25 between the drive bushing 21 and driven bushing 23, and a coupling pin 26 which is fixed in the application shaft 8 and engages the axial groove 22 in the drive bushing 21. The elements 21–25 of the adjusting mechanism are held together and prestressed by a compression spring 27 which is supported on one end (over the region of the projection 20) against a retaining ring 28 and resiliently presses at its other end against the end face of the limited-torque region 24, here a frictional conical surface, of the driven bushing 22, via a backing disc or ring 29.

The projection 20 of the thrust bushing 14 extends into an opening 30 in the caliper housing 1, which opening is of larger diameter, whereby the above-mentioned elements of the adjusting mechanism are de-coupled from the caliper housing. The projection 20 has a wrench-engageable profile 31 at its free end, whereby the brake can be advanced (toward application) or retracted, by rotating the threaded bushing 14, by means of a suitable tool. The de-coupling between the adjustment mechanism and the caliper housing ensures that no vibrations can be transmitted from the caliper housing 1 to the described elements of the adjusting mechanism.

Means 34 for limiting the screw engagement of the thrust bushing 14 with the thrust screw 19 is provided between the bottom 32 of the thrust bushing 14 and the associated end face 33 of thrust screw 19. The purpose is to limit excessive tightening when the brake is retracted. Such excessive tightening could lock together the two pieces during brake adjustment. In the example illustrated, the limiting means 34 is in the form of a cone on the end of the thrust screw.

When the brakes are in the unapplied state, the components housed in the caliper housing 1 are prestressed, by one or more compression springs 35 in the direction away from the brake rotor 2 and toward the rear of the caliper housing 1, namely cover 11.

A guiding and sealing element 36 is provided between a thoroughgoing opening 13a in the caliper housing 1 and the radial collar 15 on the thrust bushing 14.

The brake operates as follows, while further details can be taken from DE-A-43 07 019, DE-C-44 30 258, DE-A-43 07 018, EP-A-0 531 321, EP-A-0 614 025 and U.S. Pat. No. 5,400,875 and from U.S. patent application Ser. No. 08/519, 171, each of which are incorporated herein by reference.

Figure 2:
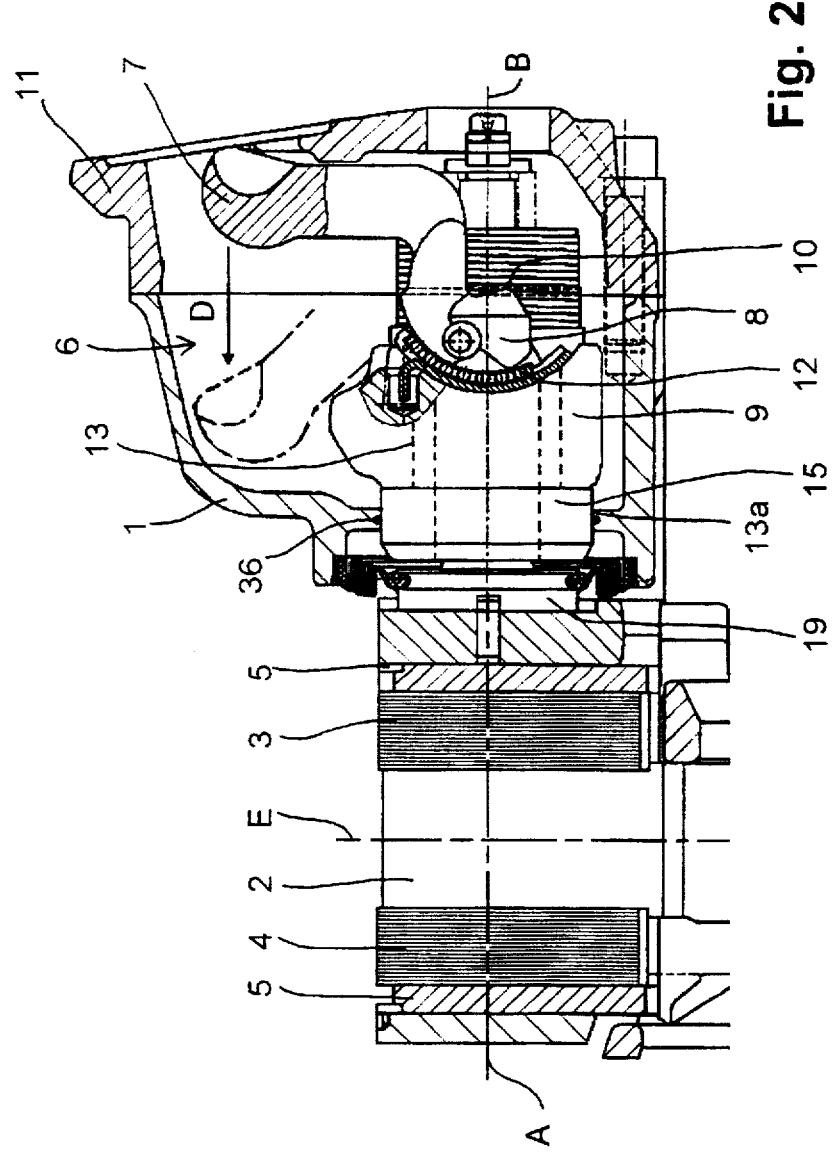
FIG. 2 is a second vertical cross section of the disc brake of FIG. 1, perpendicular to the cross section shown in FIG. 1.

In the unapplied states, gaps exist between each of the two brake pads (3, 4) and the brake rotor 2. When the brake is actuated, in known manner, the brake lever 7 is swung in direction D, whereby the application shaft 8 is rotated counterclockwise (FIG. 2). As a result of eccentric contour of shaft 8 the thrust loci on both sides—thrust counter-locus 10 against cover 11, and thrust locus 12 against thrust piece 9—the thrust piece 9 is moved toward the brake rotor 2, against the opposition of the prestressing force of the compression spring(s) 35.

The thrust piece 9, by acting on the radial collar 15, carries along with it the thrust bushing 14 mounted in piece 9, and thereby carries along the thrust screw 19 which is screwed into the bushing 14. These components are moved along axis A–B toward the brake rotor 2. During the process of releasing the brake, the thrust piece 9 retracts the thrust bushing 14, via the retaining ring 17 or the like. The thrust bushing 14 is thus coupled to the thrust piece 9 as regards axial movement. The adjusting mechanism components (21, 23, 25, 27, 28, 29) move axially along with the thrust bushing 14, in consequence of the disposition of said components and the fact that they are de-coupled from the brake caliper housing 1 (because of opening 30). The adjusting mechanism components cannot contact the housing 1. There is no relative axial movement between said components and the thrust bushing 14. Accordingly, the disadvantages of the prior art associated with such movement are avoided; this is particularly true of canting misalignment or locking which can occur during adjustment and which can lead to malfunction. In addition, with the described arrangement vibrations of the caliper cannot be transmitted to the adjusting mechanism components, because these components are decoupled from the caliper housing 1.

When the application shaft 8 is rotated it carries the coupling pin 26 with it, said pin 26 being fixed in shaft 8. Pin 26 rotationally drives the drive bushing 21 by engaging the axial groove 22 therein. This rotational movement is transmitted to the driven bushing 23 via the one-way coupling 26, here a wrap-spring coupling. Since the conical limited-torque region 24 of the driven bushing 23 is pressed against the thrust bushing 14 by the compression spring 27 which is supported against the retaining ring 28, the thrust bushing 14 is driven in rotation around the axis A–B. In the process, the thrust bushing 14 is not rotationally rigidly coupled to the thrust piece 9. As a result, therefore, of the rotation of bushing 14, the irrotatably mounted thrust screw 19 is screwed out of the thrust bushing 14 so as to increase the length of the threadedly engaged assembly comprising the bushing 14 and screw 19.

If the brake pads 3, 4 rest against the brake rotor 2, and the application shaft 8 is further rotated during a brake application stroke, the static frictions between the surface 15a of the radial collar 15 and the surface 9a of the thrust piece 9 will exceed the adjusting torque which can be transmitted via the prestressed limited-torque coupling region 24 on the driven bushing 23 to the thrust bushing 14; and likewise the static friction in the engaged threads of the thrust bushing 14 and thrust screw 19 will exceed said torque. As a result, the driven bushing 23 will slip with respect to the thrust bushing 14, and no further screwing out the thrust screw 19 toward the brake rotor 2 is possible.

During a brake release stroke, all of the interior parts are retracted by the compression spring(s) 35. Consequently, the brake lever 7 will be swung in the direction opposite to arrow D in FIG. 2, and the application shaft 8 will undergo a rotational excursion in the clockwise direction. During this process, the coupling pin 26 will rotate the drive bushing 21 in the direction opposite to the adjusting direction, and the one-way coupling 25, being ineffective in this direction of movement, will not cause rotation of any of the other adjusting elements.

A slight amount of axial play is provided between the drive bushing 21 and the driven bushing 23, which adjoins bushing 21, so as to avoid any back-adjusting of the driven bushing 23 (and thus of the thrust bushing 14) during the idle back-rotation of the drive bushing 21. This avoids undesirable rotational coupling which could result from variations in the frictional interlocking between the mutually abutting faces of the two bushings 21 and 23, and from variations in the frictional engagement of the surface 15a of the radial collar 15 and the surface 9a of the thrust piece 9. The necessary engaging friction as a static torque is produced between the thrust piece 9 and the radial collar 15 of the thrust bushing 14 as a result of the axially pre-stressing retaining ring 17 or the like.

The above-described arrangement has the following advantages: it makes the brake adjustment more reliable, it allows a more compact brake, and it facilitates and simplifies assembly and disassembly of the brake mechanism. All of the adjusting components are mounted around the thrust piece, in this case the thrust bushing, and are coupled to it, which provides for substantially easier insertion of the parts into and removal from the caliper housing in comparison to un-coupled individual parts.

While only a preferred embodiment of the invention has been described in detail, the invention is not limited thereby and modifications can be made within the scope of the attached claims.

I claim:

1. A disc brake comprising
   a brake disc,
   a thrust piece,
   an application mechanism for pressing said thrust piece towards said brake disc,
   said thrust piece extending substantially parallel with a plane of said brake disc so that said thrust piece presses a brake pad in a direction of an axis of said brake disc against said brake disc in response to an actuation of said application mechanism,
   a thrust screw extending through said thrust piece,
   a thrust bushing threadedly mounted on said thrust screw and extending through said thrust piece,
   a first abutment surface of said thrust piece directed towards said brake disc,
   a second abutment surface of said thrust bushing directed away from said brake disc,
   a spring retaining ring axially pressing said thrust piece into engagement with said thrust bushing and axially prestressing said first abutment surface into engagement with said second abutment surface,
   an application shaft of said application mechanism extending parallel to the plane of said brake disc and being rotationally driven about an axis extending parallel to the plane of said brake disc upon actuation of said application mechanism to engage and move said thrust piece towards said brake disc, and
   an adjustment mechanism including a torque-dependent one-way coupling for providing automatic, wear-compensating adjustment of a gap between said brake pad and the brake disc, the torque-dependent one-way coupling being coupled to the thrust piece for movement with the thrust piece in the direction of said disc axis.

2. A disc brake according to claim 1, including screw limiting means for limiting screwing-together of the thrust screw and the thrust bushing.

3. A disc brake according to claim 1, wherein the thrust bushing includes a radially extending collar at one end which is adjacent the brake disc, said collar defining said first abutment surface and wherein the bushing has a projecting member at its opposite end directed away from the brake disc.

4. A disc brake according to claim 1, wherein said shaft has one side directed away from the brake disc supported against a thrust counter-surface of the caliper housing and wherein the thrust piece is disposed on an opposite side of said shaft directed toward the brake disc.

5. A disc brake according to claim 1 wherein the application shaft has a rotation axis which is fixed with respect to the brake-disc.

6. A disc brake according to claim 1 wherein the application shaft is coupled to an element of the adjustment mechanism by a pin-and-groove coupling.

7. A disc brake according to claim 1 wherein the adjustment mechanism comprises a drive bushing and driven bushing each mounted coaxially on the thrust bushing and located in a cavity in the application element.

8. A disc brake according to claim 7 wherein said drive bushing and said driven bushing are disposed on the thrust bushing with axial play therebetween.

9. A disc brake according to claim 4, including, a recess in the thrust counter-surface of the caliper housing, said recess receiving one end of a thrust bushing forming a part of said thrust mechanism.

10. A disc brake according to claim 9, wherein said recess comprises a opening through a cover of the caliper housing.

11. A disc brake according to claim 4, wherein the disc brake is a sliding caliper brake.

12. A disc brake according to claim 1, wherein the thrust bushing extends into a opening formed through a part of the caliper housing adjacent the brake disc and a sealing element is provided between the caliper housing and the thrust bushing in said opening.

* * * * *